US005562789A

United States Patent [19]

Hoffmann

[11] Patent Number: 5,562,789
[45] Date of Patent: *Oct. 8, 1996

[54] LABEL-EQUIPPED WEB METHOD

[75] Inventor: Donald J. Hoffmann, Elhmurst, Ill.

[73] Assignee: Wallace Computer Services, Inc., Green Bay, Wis.

[*] Notice: The term of this patent shall not extend beyond the expiration date of Pat. No. 5,421,942.

[21] Appl. No.: 420,689

[22] Filed: Apr. 12, 1995

Related U.S. Application Data

[63] Continuation-in-part of Ser. No. 101,377, Aug. 2, 1993, Pat. No. 5,421,942, Ser. No. 882,433, May 13, 1992, Pat. No. 5,271,787, and Ser. No. 886,739, May 21, 1992, Pat. No. 5,254,381.

[51] Int. Cl.$^6$ .............. B32B 31/08; B32B 31/10; B32B 31/12; B32B 31/18
[52] U.S. Cl. .............. 156/64; 156/265; 156/270; 156/277; 156/278; 156/289; 156/290; 156/302; 156/324
[58] Field of Search ............ 156/64, 268, 269, 156/270, 277, 278, 289, 302, 324, 353, 354, 291, 264, 290, 265; 428/42

[56] References Cited

U.S. PATENT DOCUMENTS

| | | | |
|---|---|---|---|
| 3,711,353 | 6/1973 | Zimmer | 156/353 X |
| 4,151,319 | 4/1979 | Sackoff et al. | 156/289 X |
| 5,279,875 | 1/1994 | Juszak et al. | 428/42 |
| 5,421,942 | 6/1995 | Hoffmann | 156/268 X |

FOREIGN PATENT DOCUMENTS 2-121896  5/1990  Japan.

Primary Examiner—David A. Simmons
Assistant Examiner—M. Curtis Mayes
Attorney, Agent, or Firm—Tilton, Fallon, Lungmus & Chestnut

[57] ABSTRACT

A label-equipped web method wherein the label is die-cut from base stock constituting the sheet and held in place by a pressure-sensitive adhesive-equipped release liner, the web constituting the release liner having a pattern of coatings thereon including a pattern of release material applied at a first site so as to leave bands uncoated and thereafter coated at a second site with pressure-sensitive adhesive so as to permanently attach the liner to the sheet in the band area to resist shearing forces tending to dislodge the liner.

15 Claims, 2 Drawing Sheets

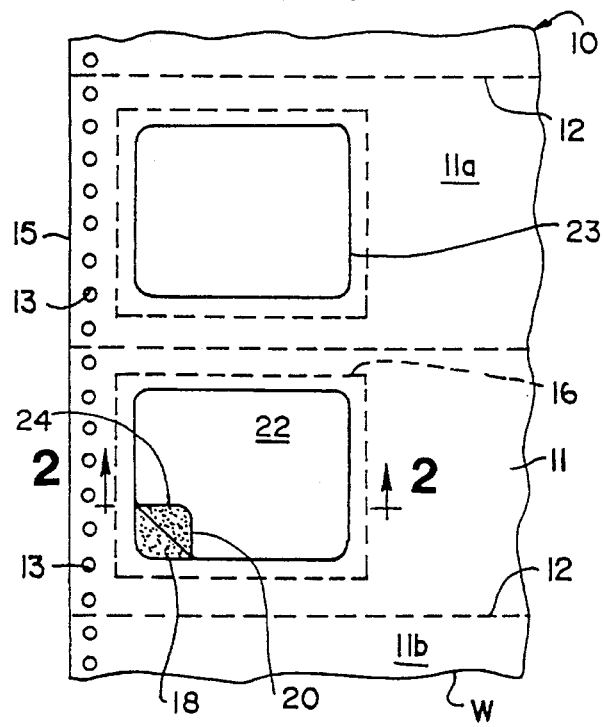
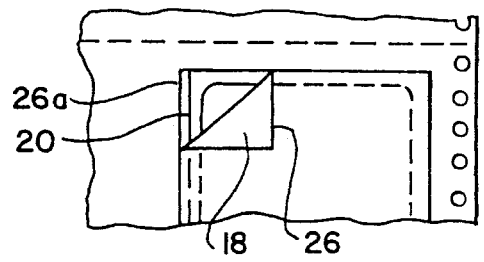
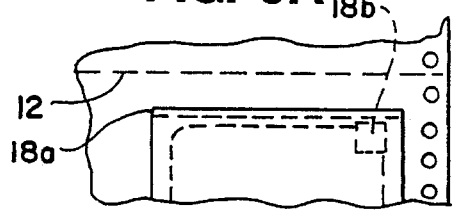
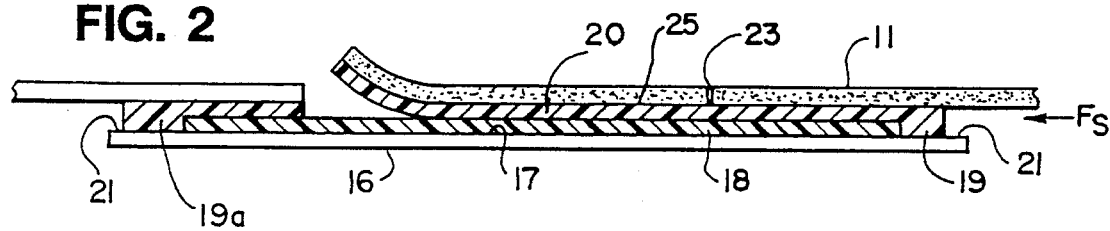
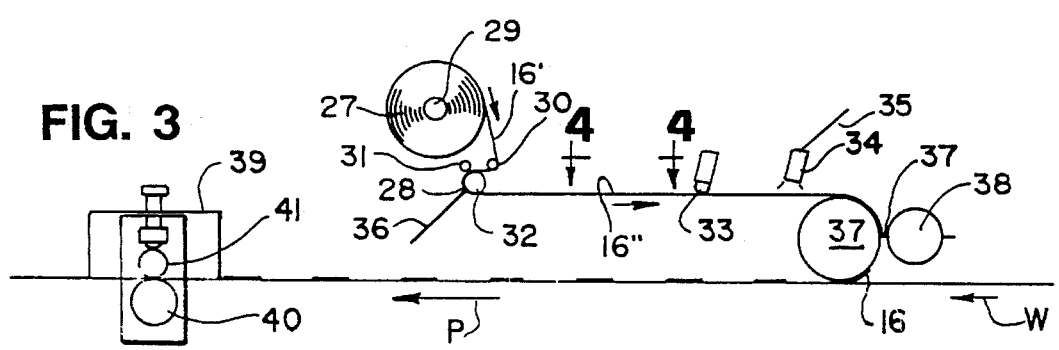
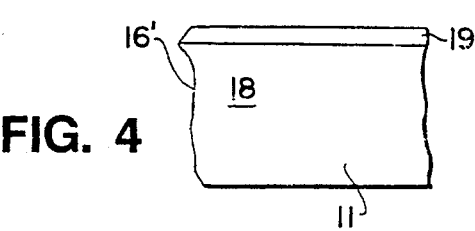
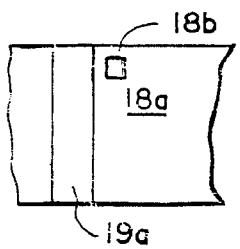

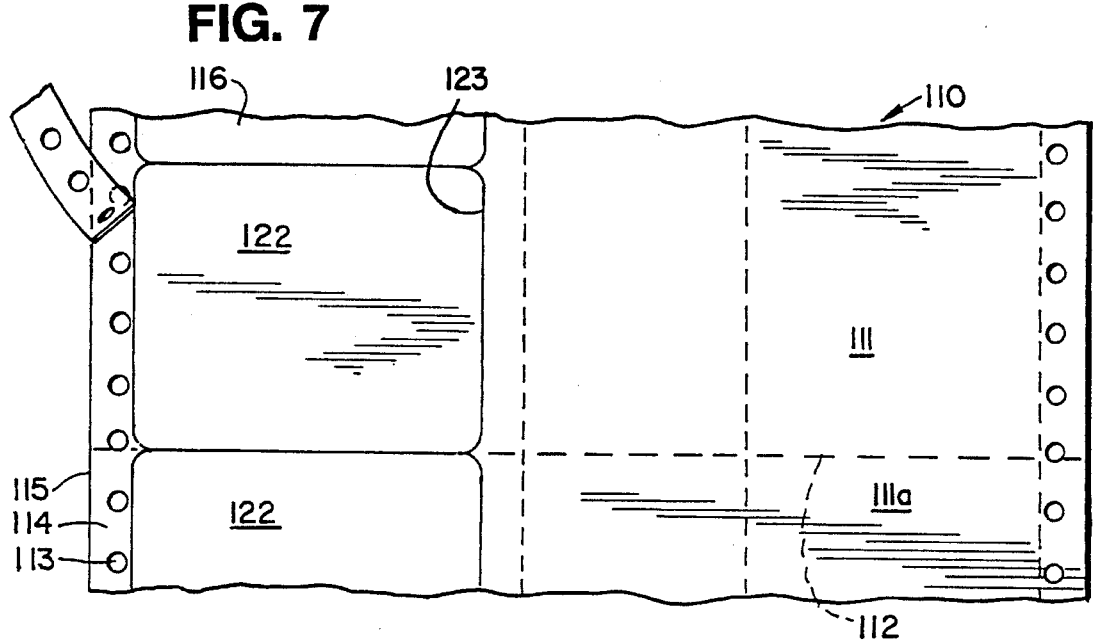
FIG. 7
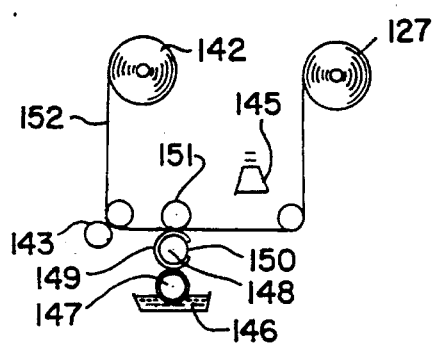
FIG. 8A
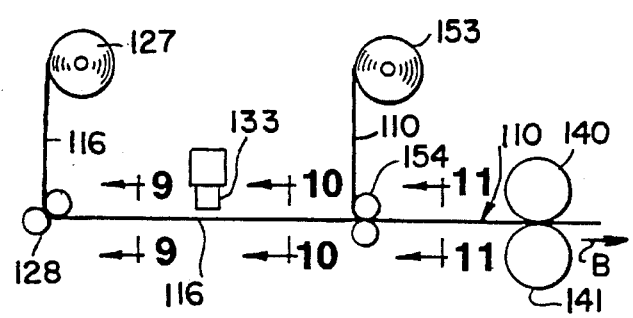
FIG. 8B
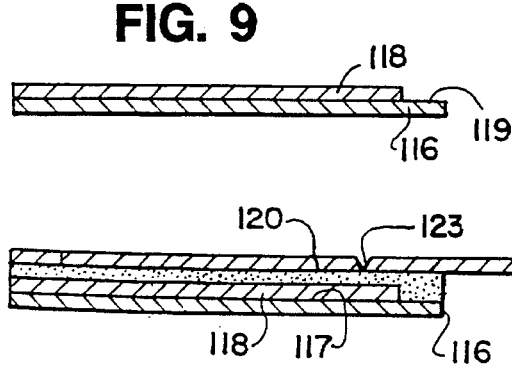
FIG. 9
FIG. 10
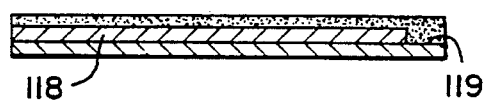
FIG. 11
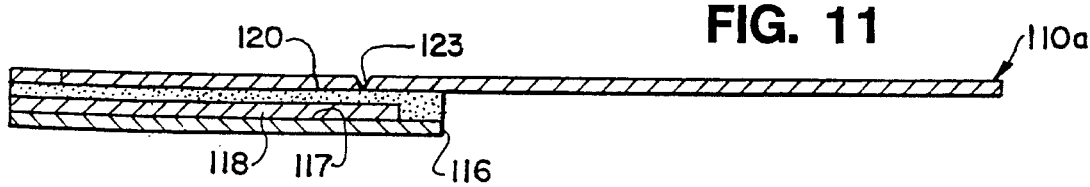

LABEL-EQUIPPED WEB METHOD

This application is a continuation-in-part of applications Ser. No. 101,377 filed Aug. 2, 1993, now U.S. Pat. No. 5,421,942, Ser. No. 882,433 filed May 13, 1992, now U.S. Pat. No. 5,271,787 and Ser. No. 886,739 filed May 21, 1992, now U.S. Pat. No. 5,254,381.

BACKGROUND AND SUMMARY OF INVENTION

This invention relates to a label-equipped web method and, more particularly, to a sheet or form wherein the label is die-cut from base stock constituting the sheet, held in place by a pressure sensitive adhesive-equipped release liner, and printed thereafter.

It has become increasingly desirable to provide sheets generally and business forms particularly of minimal thickness for ease in processing through computer printers, especially table top personal computers with associated printers. One approach to achieve this has been to diecut the form itself to provide a removable label. This art is well known for die cut labels generally in U.S. Pat. Nos. 3,914,483 and 4,246,058 and for business forms in U.S. Pat. No. 4,379,573.

However, with the processing of sheets such as business forms through printers and the subsequent converting of the connected forms into a roll or a zig-zag pack, there arises the possibility of the release liner becoming detached through the imposition of shear forces. This exposes the pressure sensitive adhesive on the now-exposed face of the sheet with many undesirable consequences. Further, the current trend of omitting adhesive along the edge of an attached member increases the possibility of undesirable detachment. Illustrative of this trend in the art is exemplified by U.S. Pat. Nos. 3,926,113; 4,526,405, 4,664,416 and 5,011,559. The drawbacks of the prior art are avoided by the invention.

According to the invention, the release liner is strongly adhered to the rear face of the larger label stock web along one or two edges of the release liner. This is accomplished by providing the above-mentioned edge or edges free of release material—which is normally a silicone. The absence of a silicone on the surface of the liner confronting the adhesive provides a band on the release liner where the adhesive between the liner and web can integrate the liner and web substantially permanently. When the web over the liner is perimetrically diecut to provide a label spaced slightly from the band, the label can be removed while the web and liner remain together. Thus, there is no exposed adhesive on the rear face to cause the label stock to undesirably adhere to some other surface or sheet.

It is known to provide a wider label stock web and diecutting it over a narrower release liner—as set forth as prior art in U.S. Pat. No. 4,627,994. However, the release liner did not have an edge band or bands lacking the release coating—so it could not achieve the strong bond to the label stock web. From there, the art workers went away from the idea of a silicone free band. Instead, they went to separately attached webs as in the invention of the '994 patent and subsequent U.S. Pat. No. 4,696,843 and co-owned U.S. Pat. Nos. 4,865,669 and 5,006,191.

The one teaching of adhering a release liner to label stock by omitting a release material is Japanese application No. 63-274975 but did this by having a full perimeter free of release material so that the color former-equipped liner was immobilized for duplication thereon of the information printed on the label.

In the preferred embodiment of the invention, the advantages of retaining the release liner on the label sheet along an edge are provided by applying a pattern of coatings on the web patch or ply constituting the release liner. More particularly, a web ply is first coated with a pattern of release material (such as a silicone) in a pattern so as to leave an uncoated edge. Alternatively, a web ply fully coated with release material may be overcoated along an edge or edges to blank-out the silicone. In the illustrated embodiment, the pattern of silicone is previously coated at the production plant or at a coating facility. In either event, it is off-line from the remainder of the processing steps. Thus, the release liner is produced at a first site while the final product is produced at a second site. For example, the sites may be in the same building or in separate buildings.

Thereafter, the entire ply is overcoated substantially over its already coated face with pressure sensitive adhesive—especially on most of the uncoated or overcoated edge or edges. When performed continuously, it is possible omit the release coating from either a longitudinal band or a transverse band and thereafter coat with adhesive this area as well as the previously release coated area. When either a continuous ply, viz., elongated web, or patches severed from a continuous ply are applied to a form or other label carrier constructed of label stock, the adhesive band of the release liner web or patch adheres strongly to the form, effectively preventing detachment or dislodgment during printing and/or subsequent handling.

More particularly, the liner patch remains "frozen" in place during the imposition of shear forces to it and/or the sheet. It will be appreciated that the sheet or web usually is subjected to a number of movements parallel to its plane. Any contact with the surface bearing the liner patch will result in a force parallel to the sheet plane. Irrespective of the direction of this force, i.e., longitudinal or transverse or a combination thereof, it is effectively resisted by the permanency of the band of adhesive union between the sheet and the liner patch.

Examples other than printing where the patch-equipped sheet can be subjected to shearing forces are bursting, zig-zag folding, convolute winding and just plain insertion into an envelope. Even further, it will be appreciated that there are a myriad of forces possible in further handling which, even though they are not strictly parallel to the plane of the sheet, have a component parallel to the sheet which again can be effectively resisted by the instant invention.

The details of the invention can be seen in the ensuing specification.

BRIEF DESCRIPTION OF DRAWING

The invention is described in conjunction with the accompanying drawing, in which FIG. 1 is a fragmentary top plan view, partially in perspective of a continuous web such as business form string featuring the invention;

FIG. 2 is an enlarged sectional view such as would be seen along the sight line 2—2 applied to FIG. 1;

FIG. 3 is a side elevational view (essentially schematic) of apparatus employed in the practice of the inventive method;

FIG. 4 is a fragmentary top plan view of the initially coated web such as would be seen along the sight line 4—4;'

FIG. 5 is a view similar to FIG. 4 but of a modified version of the invention;

FIG. 6 is a fragmentary bottom plan view of the form seen in FIGS. 1 and 4;

FIG. 6A is a view similar to FIG. 6 but of the form of FIG. 5;

FIG. 7 is a fragmentary top plan view, partially in perspective of a portion of a continuous web such as business form string featuring another version of the invention;

FIG. 8A is a side elevational view (essentially schematic) of apparatus employed at the first site for producing the release liner;

FIG. 8B is a view similar to FIG. 3 of apparatus for producing the product of FIG. 7; and FIGS. 9–11 are transverse sectional views of the web/webs advancing from left to right in FIG. 8 as would be seen along the various sight lines 9—9, 10—10 and 11—11.

DETAILED DESCRIPTION

Referring to FIG. 1, the numeral 10 designates generally a string of interconnected business form lengths of the general type seen in co-owned U.S. Pat. No. 4,664,416. One form length of the web W is designated 11 with the adjacent preceding length being designated 11a and the following length 11b. As seen in FIG. 2, the form length is hatched to indicate paper but it will be appreciated that other label stock materials can be employed.

Usually, the form lengths are produced continuously and conveniently converted to rolls or zig-zag folded packs for shipment. Lines of transverse perforation 12 define the ends of each form length. The entire string is equipped with line holes 13 defining a control punch margin 14 along at least one longitudinally extending side 15.

Normally, however, line holes and therefore control punch margins, are provided along both longitudinal sides for better control of the web during both manufacture and subsequent processing through the computer printer—as seen in the '416 patent. However, for simplicity of presentation, the other control punch margin has been omitted from FIG. 1 and when the base stock web is just a sheet, both margins are usually omitted, as would be the case with snap-out forms.

It will be seen in FIG. 2 that the form length 11 is equipped with a novel patch 16 which combines the function of a release liner and an adhesive carrier. On one face 17 of the patch 16, a pattern of silicone material 18 is applied. It will be noted that the release coating does not extend to one edge of the patch 16, the area uncoated with release material being designated 19 (see also FIG. 4). As indicated above, two edge portions may be uncoated or overcoated to have two portions of the release liner frozen or permanently attached to the label stock. Depending upon the economics of production, intended use or further handling of the sheet or form, the two frozen edges may be both longitudinal, both transverse, or one of each. For example, a corner may be left without a confronting release surface—as where the blanking extends only partway of both an adjacent longitudinal and an adjacent transverse band. The important thing however is that to freeze an edge portion of the release liner to the label-providing web in such a way as to oppose the shearing force most likely to be encountered in the subsequent handling or use of the sheet or form. But for ease of presentation, the description herein is of an embodiment having only a single edge so prepared as to freeze to the accompanying label-providing stock.

In any event, overlying both the release coating 18 and the heretofore uncoated area 19 is a layer or coating of pressure sensitive adhesive material 20. In particular, the coating 20 extends over at least a continuous substantial portion of the area 19. It is possible to leave a minor portion 21 of the area 19 uncoated while still achieving the benefits of the invention.

As indicated above, the edge free of release material (and thus permanently bonded or "frozen" to the web 10) can be provided as seen at 19a in FIG. 5. There, the band 19a extends transversely of the length of web 111 rather than longitudinally as in FIG. 4—as by interrupting the silicone 18a as at 19a. In either event, the invention can provide a series of release liner patches applied to the form lengths 11, 11a, 11b, etc.

In FIG. 1, a plurality of labels each generally designated 22 is provided by a closed perimeter die cut 23 in each of the form sheets 11, 11a, 11b, etc. A corner or edge 24 thus can be readily lifted as illustrated in FIG. 1. This exposes the silicone or other liner material 18 on the liner 16 and also the adhesive 20 on the inner face 25 of the web 11 (see FIG. 2).

In contrast, this is not possible at the portion 26 which is seen in FIG. 6. There, the attempt to "peel back" the corner results in tearing a portion of the liner as at 26a which is frozen, i.e., permanently attached to the web 11.

It is believed that the invention can be further understood by describing the method of producing the label-equipped form and this is set forth following in connection with FIG. 3.

The Method of Production

Referring now to FIG. 3, the symbol W designates a web proceeding along a longitudinally extending path designated by an arrow P. The path normally is provided by side frames (not shown) and which carry the various processing rollers. Provided adjacent the path P is a parent roll 27 of web material having a pattern of silicone or other release material. This may be a bond paper previously coated off-line at the supplier's plant with silicone or it may have been coated at another plant such as a captive coating plant, i.e., another site either inside or outside the plant containing the line illustrated in FIG. 3. The operation of coating the liner web will be described hereinafter in connection with FIG. 8A. In any event, the liner web is normally provided in roll form. Thus, a continuous liner ply 16' is unwound from the roll 27 by means of an infeed 28 to provide the web 16". More particularly, the roll 27 is mounted on a spindle 29 provided as part of an unwind (not shown). The ply 16' proceeds around idler 30 and into the nip between draw rolls 31, 32 constituting the infeed 28.

At this juncture, the ply 16" may have the release material arrangement seen in FIG. 4 where the band or uncoated area 19 is along one longitudinally extending edge. In some instances the silicone-free band may be along both edges. Still further, the uncoated areas may extend transversely as seen in FIG. 5—as at 19a relative to coated area 18a.

When the coating extends transversely as in FIG. 5, a printed register mark 18b is applied to the web at equal intervals corresponding to the spacing between uncoated areas 19a. The register mark 18b determines the position of the cutoff of the web 16" relative to the register mark.

Either the FIG. 4 or the FIG. 5 constructions can be achieved at the first site by applying the silicone using flexo coating or gravure technology. In the case of FIG. 4, the uncoated area or band 19 extends longitudinally and is advantageously achieved by limiting the width of the plate cylinder employed at the first site. In FIG. 5, the silicone has been applied intermittently, i.e., by cyclically interrupting the flow of material to the receiving web by limiting the circumferential length of the plate on the plate cylinder. Then, if the transverse area 19a illustrated in FIG. 5 is transversely severed midway of its width at the customer's plant, release material free bands will be provided at both the leading and trailing edges of the patch 16.

The web 16" now advances past nozzle 33 which applies pressure sensitive adhesive continuously and substantially across the entire width of the web 16". In the case of the FIG. 4 embodiment I omit, for example, the minor edge portions 21, if desired. These may be of the order of 1/16". It has been found advantageous to provide a coating weight of 8–10 pounds per ream (500-22×26) of hot melt adhesive. This is in comparison with about 2 pounds per ream of water based adhesive.

The web 16" thereafter passes under a scanner 34 which is coupled by line 35 to driving means 36 for the draw rolls 32, 31. The scanner 34 senses the register marks 18b for slowing down or speeding up the draw rolls 31, 32. This results in making sure that the transverse cut achieved by the cutoff mechanism 37, 38 always occurs at the same position relative to the register marks 18b.

For cutoff, the liner ply 16" passes around a vacuum roller 37 for engagement with the knife-equipped cutoff roller 38. By rotating the vacuum cylinder 37 at a speed faster than the speed of the liner ply 16", spaced apart patches 16 of liner material are applied to the web W being advanced along the longitudinal path P. The speed of web W is the same as the surface speed of the vacuum cylinder 37 so that proper spaced apart placement of the patches 16 occurs.

Downstream of the point at which the patches or plies of liner material 16 are applied to the web W, the web W is subjected to a die cutting operation as at 39. This is brought about by the operation of a knife roller 40 bearing against an anvil roller 41 so as to cut the closed perimeter 23 only in the web W and not in the liner patch 16. It will be appreciated that the closed perimeter die cut 23 is within the confines of the release liner 16—see FIG. 1.

Summary of FIG. 3 Method

According to the invention, a label-equipped web method employs the following steps. First, there is the step of generating at one site a roll or other source of generally rectangular liners 16 coated with release material 17 except for a band 19 free of the release material and being located along one or two edges of the liner.

As indicated above, the precise shape of the silicone-free band is advantageously a function of the type of shearing stress to be resisted. In some instances, a corner type of edge portion may be that which is "frozen" to the label-providing stock. Generally speaking, however, it is preferable to have a band or stripe of non-release material extending along an edge, either longitudinally or transversely of the web 16".

The method also includes the step of providing a label stock form having a size greater than the size of the liner (see particularly FIGS. 1 and 6). Thereafter, the method includes the step of bringing the web 11 and the liner 16 together with pressure sensitive adhesive 20 therebetween to strongly adhere the liner band 19 to the web 11. Then, the method includes the step of perimetrically die cutting the web as at 23 to provide a label 22 in a location over the liner 16 and spaced from the band 19. The method further includes the step of subjecting the label-equipped web to a force $F_s$ tending to shear the liner from the web with the band 19 resisting the shear force to maintain the liner against dislodgment and in position on the web.

Embodiment of FIGS. 7–11

Referring to FIG. 7, the numeral 110 designates generally a string of interconnected business form lengths. One fragmentary form length is designated 111 with the adjacent following length being designated 111a. Lines of transverse perforation as at 112 define the ends of each form length. The entire string is equipped with line holes 113 and a control punch margin 114 at least along one longitudinally extending side 115.

The form length 111 is equipped with a release liner 116 (usually a silicone coated ply) which extends continuously along the string 110—see the left hand side of FIG. 7. However, the width of the liner 116 is less than that of the string 110 as can be appreciated from a consideration of FIG. 11. There, the release liner ply 116 has one face 117 equipped with a silicone coating 118 which, as before, extends over less than all of the face 117—leaving a bare area or band 119. Overlying the release liner silicone coating 118 and the uncoated area 119 is a pressure sensitive adhesive 120.

As before, a plurality of labels 122 are provided in the web 110 for each one of the form lengths 111, 111a, etc. Each label 122 is defined by a perimetric diecut 123 in the string 110. As pointed out before, the release liner 116 is continuous—running from one form length to the next, but narrower. In other words, the liner 116 has a predetermined width and the web 110 has a width greater than that predetermined width.

Method of Producing Release Liner

This is illustrated in FIG. 8A where a roll of web material 142 is unwound by infeed rolls 143 and subjected to coating of silicone or like release material by a three roll flexo coater generally designated 144 and thereafter to drying as at 145 before being rewound into roll 127. This is the conclusion of the work performed at the first site which, as indicated previously, may be either in the same or a different plant from the subsequent processing which is now described in conjunction with FIG. 8B.

An advantageous three roll flexo coater generally designated 144 include starting from the bottom a fountain 146 which advantageously contains silicone or like release liquid coating material. Rotating in the fountain 146 is a fountain roll 147 which transfers the silicone to a plate cylinder 148. The plate cylinder 148 is equipped with a plate 149 providing a gap 150 so as to be specially adapted for producing transverse areas of uncoated liner such as is illustrated at 19a in FIG. 5. Uppermost in the FIG. 8A showing of the three roll flexo coater 144 is a backup cylinder 151 for engaging the web 152 which is unwound from the roll 142.

The showing in FIG. 8B corresponds in some measure to that previously depicted and described in conjunction with FIG. 3.

Again there is a parent roll 127 of liner material similar to roll 27 of FIG. 3 which is adapted to be unwound to provide the liner 116. This then proceeds along a horizontally extending path designated by the arrow marked P. The path normally is provided by side frames (not shown) which carry the various processing rolls. The liner ply 116 is unwound from the roll 127 by means of an infeed 128 with the pattern of previously provided silicone being of the types depicted in FIG. 4 or FIG. 5. Thus, downstream of the infeed 128, the cross sectional condition of the ply 116 can be seen in FIG. 9—there being an uncoated band or area 119, i.e., not covered by silicone 118.

The web 116 now passes under nozzle 133 by which adhesive is applied resulting in a web cross-sectional configuration depicted in FIG. 10. There it will be noted that the band 119 is free of the silicone coating 118.

Still proceeding to the right in FIG. 8, the ply of FIG. 10 is equipped with the web 110 which is provided by a parent roll 153 along with a suitable draw roll means 154. The condition of the composite web 110 downstream of the draw roll means 154 is seen in FIG. 11. Thereafter the diecuts are applied by a knife roller 140 (referring to the right hand portion of FIG. 8B) operating against an anvil roll 141.

While in the foregoing specification, a detailed description of an embodiment of the invention has been set down for the purpose of illustration, many variations in the details hereingiven may be made by those skilled in the art without departing from the spirit and scope of the invention.

I claim:

1. A label-equipped web method comprising the steps of providing at a first site a liner having one face coated with release material except for a band free of said material, providing at a second site a label stock form web having a size greater than the size of said liner, bringing said web and liner together with pressure sensitive adhesive therebetween to strongly adhere said liner band to said web and perimetrically diecutting said web to provide a label in a location over said liner and spaced from said band, and subjecting said web to a force tending to shear said liner from said web, said band resisting said shear force to maintain said liner in position on said web.

2. The method of claim 1 in which said method includes at said first site providing said liner in roll form and thereafter transferring said roll to said second site.

3. The method of claim 2 in which said method includes at said first site coating a second web with release material and winding said second web into a roll for transfer to said second site.

4. The method of claim 1 in which said method includes at said first site providing said band along at least a part of an edge.

5. The method of claim 1 in which said method includes at said first site providing a second band free of said material on said liner one face, said bands extending along two liner edges which are parallel.

6. The method of claim 1 in which sid method includes at said first site providing a second band free of said material on said liner one face, said bands extending along two liner edges which are orthogonally related.

7. The method of claim 1 in which said method includes at said first site providing said one face of said liner with a plurality of equally spaced transverse bands free of said release material.

8. The method of claim 7 in which said method includes at said first site applying a register mark to said liner adjacent each transverse band.

9. The method of claim 8 in which at said second site said method includes sensing said register marks to sever said liner in predetermined relation to each register mark prior to bringing said web and liner together.

10. The method of claim 1 in which the first mentioned providing step includes flexo or gravure coating said liner face.

11. A label-equipped web method comprising the steps of providing at a first site an elongated liner web and flexo or gravure coating thereon a pattern of a release material so as to define at least one band free of release material, said band extending in one of a longitudinal or transverse direction of said liner web, transferring said web to a second site and overcoating at said second site said liner web with a pressure sensitive adhesive extending substantially over said band to provide a strip of adhesive on said band, providing at said second site an elongated label stock web, applying the twice coated liner web to said label stock web, die cutting said label stock web to provide a rectangular label offset from said band, and subjecting said liner web to a force tending to shear said liner web from said label stock web, said band and the adhesive thereon resisting said shear force to maintain said liner web in position on said label stock web.

12. The method of claim 11 in which said method includes at said first site providing said liner web in roll form and thereafter transferring said roll to said second site.

13. The method of claim 11 in which said method includes at said first site providing said liner web with a plurality of equally spaced transverse bands free of said release material.

14. The method of claim 11 in which said method includes at said first site applying a register mark to said liner web adjacent each transverse band.

15. The method of claim 14 in which at said method includes said second site sensing said register marks to sever said liner web in predetermined relation to each register mark prior to bringing said label stock web and liner web together.

* * * * *